United States Patent [19]

Lee

[11] 3,911,401

[45] Oct. 7, 1975

[54] HIERARCHIAL MEMORY/STORAGE SYSTEM FOR AN ELECTRONIC COMPUTER

[75] Inventor: Hua-tung Lee, Poughkeepsie, N.Y.

[73] Assignee: International Business Machines Corporation, Armonk, N.Y.

[22] Filed: June 4, 1973

[21] Appl. No.: 367,046

[52] U.S. Cl. .......................... 340/172.5; 340/172.5

[51] Int. Cl.[2] .......................... G06F 13/00

[58] Field of Search .......................... 340/172.5; 444/1

[56] References Cited

UNITED STATES PATENTS

| | | | |
|---|---|---|---|
| 3,541,529 | 11/1970 | Nelson | 340/172.5 |
| 3,573,750 | 4/1971 | Ishidate | 340/172.5 |
| 3,588,839 | 6/1971 | Belady et al. | 340/172.5 |
| 3,647,348 | 3/1972 | Smith et al. | 444/1 |
| 3,701,107 | 10/1972 | Williams | 340/172.5 |

*Primary Examiner*—Raulfe B. Zache
*Attorney, Agent, or Firm*—Wolmar J. Stoffel

[57] ABSTRACT

A hierarchial memory/storage system in which the data is transferred between a high speed local storage, responsive to the processing unit of the computer, and a plurality of higher levels of larger low speed storage wherein data available to the central processing unit is shifted between the various levels of the hierarchial system in a highly efficient manner. In operation, the system in responding to the central processing unit for making available data in the high speed lowest hierarchial level, will seek out the instant lowest buffer memory/storage level containing the required information, form a path of expendable blocks or page frames in the various buffer levels from the adjacent lower level down to the $H_1$ level, shift any updated information in the path of expendable pages to the off-the-path pages at appropriate higher levels utilizing the successively lengthened cleared upper path for forward and rearward transfer of blocks or pages within the memory system, and subsequently, when the complete clear path of expendable blocks or page frames is formed, transfer and filter the called-for data segments through the path to the level of the hierarchial memory responsive to the processing unit of the computer.

16 Claims, 8 Drawing Figures

HIERARCHIAL MEMORY/STORAGE SYSTEM FOR AN ELECTRONIC COMPUTER

BACKGROUND OF THE INVENTION

This invention relates to hierarchial memory/storage systems for electronic computers, and more particularly, for a hierarchial memory/storage system that will more efficiently transfer data between the various hierarchial buffer memory levels to the lowest level responsive directly to the central processing unit.

In an electronic computer, it is highly desirable to store all information in such a manner that it is immediately available for control and processing. To achieve the fastest processing, the best storage apparatus would be one having a capacity as large as the largest possible problem requires and the highest possible speed. However, since the price of storage is an increasing function of the product of speed times capacity, the price of a large capacity high speed memory becomes prohibitive. Therefore, existing high speed memories have a relatively small capacity which is often exceeded by the amount of information required for large problems or multi-programming.

One solution to the problem of providing sufficient high speed memory for large problems or multiprogramming is the one level store machine. In such a machine, a large capacity, low speed store is provided which has sufficient capacity to store all the information required for any desired problem. A low capacity, high speed store is also provided and programs are written as if all the information were in this high speed store. A third memory, commonly referred to as a mapping store, is also provided which indicates which information from the low speed store is also contained in the high speed store at any given time. When the program running on the computer requires a particular word of information, a search and check is made to see if the word is in the high speed store. If is is in the high speed store, the information is retrieved and used. If the word is not in the high speed store, a search operation is performed with the required word being transferred from the low speed, back-up store to the high speed store. While it is possible that this exchange could be made on a single word basis as the necessity arises, it has been found that, due to the slow speed of the back-up store, the time expenditure involved in making the transfer is frequently almost independent of whether a single word or a block of words is transferred. Experience has shown that the probability is high that if a word is required, others in its locality will also be needed soon. Therefore, when a determination is made that a word of information is required from the back-up store, a transfer of the block containing this word is made from the back-up store to the high speed store.

As long as there are empty blocks of page frames in the high speed store, the above described transfer operation presents no problem. However, when the high speed store is full, a replacement problem arises. When replacement of an information block is required, an ideal replacement criteria will always cause the block of information which is not going to be used again for the longest period of time to be replaced. When the hierarchial memory is composed of a plurality of levels, the ensuing transfer of information required by the processing unit becomes very involved. Such transfers are customarily handled by a switching process known as page swapping. The level in the hierarchial memory having the page of information containing the requested segment of data transfers a copy of that page to the next intermediate forward lower level. Before the transfer, the immediate lower level must execute an algorithm to determine which page of information occupying a page frame is most expendable. If the page in the selected page frame contains altered or marked data, this altered information must be transferred upwardly to update the parent page before the information occupying the page frame can be erased by writing the desired information from the upper level into it. This series of switching process to clear the page frames constitutes a secondary page movement, in contrast to the primary page movement which brings about the direct result of filtering the desired pages and subpages towards the processing unit. As can be appreciated, when the hierarchial memory contains a plurality of buffer memory levels, transfer of pages from the upper levels forward to the lower levels can become very involved and time-consuming as cmpared to the operating speed of the processing unit.

SUMMARY OF THE INVENTION

It is an object of this invention to provide an improved hierarchial memory for a computer system in which information within the various buffer memory levels can be transferred more efficiently and at higher speeds.

Another object of this invention is to provide an improved method for transferring data within a hierarchial memory system for a computer system.

In accordance with the above objects, this invention is a hierarchial memory system for use with an electronic computer having a memory system which includes a large capacity relatively low speed backing store, a plurality of buffer memory levels having increasingly smaller capacities and increasingly higher accessing speeds, the lowest buffer memory store level responsive to a central processing unit, a first transferring means to transfer complete pages of data from the backing memory store forward between the buffer memory levels, a mapping store means associated with each buffer memory level to identify and indicate altered and unaltered page segments of data within the level, the improvement being the addition of a means to form a path of expendable pages in the individual buffer memory levels between the lowest level containing a data segment called for by the processing unit, and the level responding directly to the processing unit, and a means to move the data page containing the requested data segment forward through the path.

DESCRIPTION OF THE DRAWINGS

The foregoing and other objects, features and advantages of the invention will be apparent from the following more particular description of preferred embodiments of the invention as illustrated in the accompanying drawings.

DESCRIPTION OF THE PREFERRED EMBODIMENTS

Figures 1, 2:
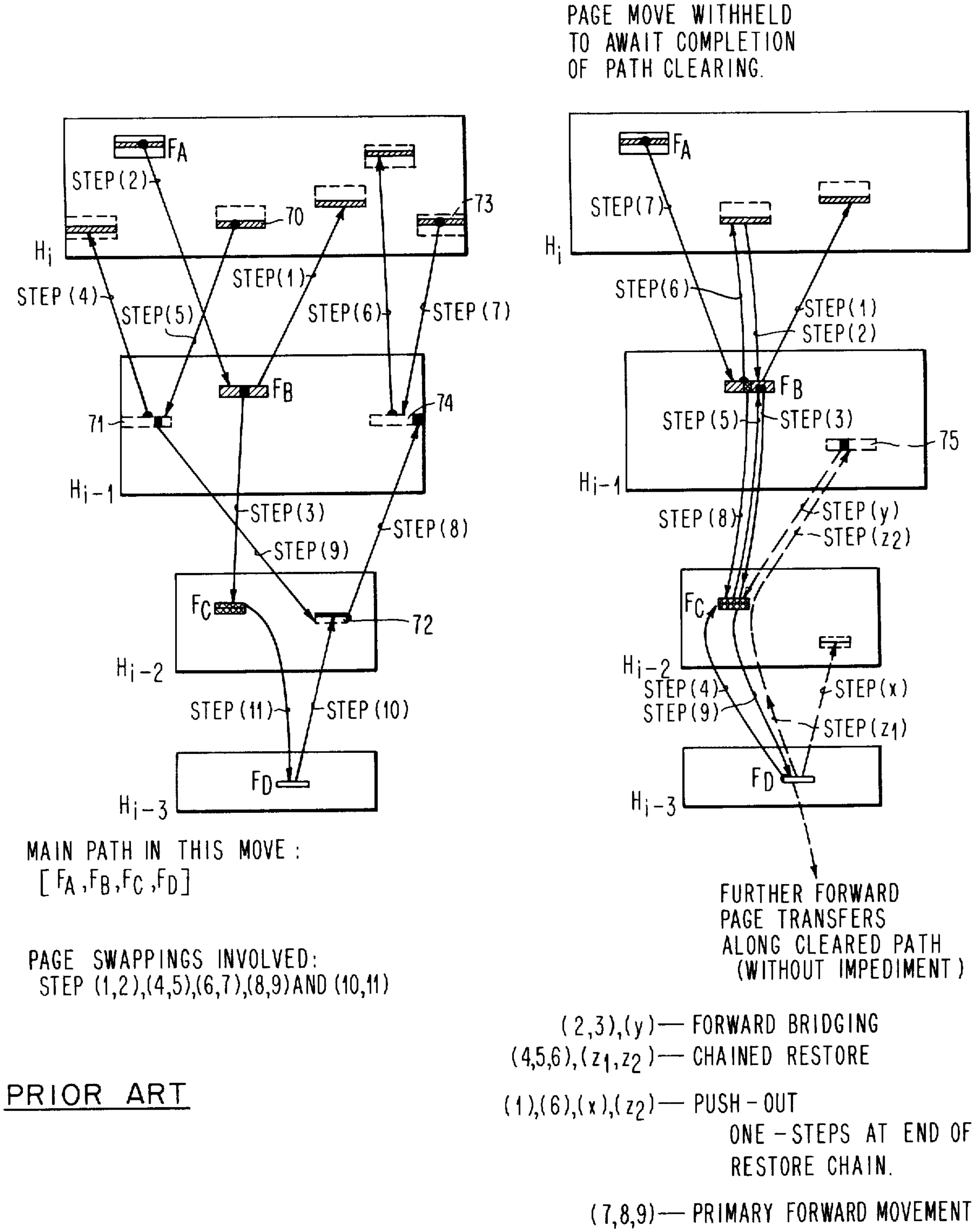
FIG. 1 is a schematic block diagram of a hierarchial memory illustrating the procedure of transferring a block of information forward by the page swapping technique which is known in the prior art.
FIG. 2 is a schematic block diagram of a hierarchial memory illustrating the transfer of blocks of information by the method and structure of the subject invention.

The use of hierarchial memory systems of two or nore levels has become popular in medium and large cale electronic computers since the mid-1960's. Hie-archial memory systems were introduced into elec-ronic computers, particularly large scale computers, ›ecause there was a demand for the use of memories ›f larger and larger capacities with faster and faster peeds. With the present day technology and the tech-ıologies of the foreseeable future, it is not economi-:ally feasible to build memories of both very large ca-›acities, on the order of multi-million bytes, and very ;reat speed on the order of sub-microsecond cycle imes. Further, the structure of practically all computer ›rograms contains substantial sections of which the ex-:cution follows a pseudo-sequential and/or locally re-›etitive access patterns to the memory locations. Thus, luring processing, only a relatively small portion of the nformation in the overall memory is utilized at any ;iven period of time. It is these characteristics then that nake the hierarchial memory a partial solution to the ıforementioned problems.

Basically, a memory hierarchy is constructed of a arge capacity memory, commonly referred to as a ›acking store, which is necessarily of inferior speed, ınd one or more successively smaller memories of in-:reasingly faster speeds. These memories are organized n the level structure illustrated schematically in FIG. ❘. The highest level memory $H_L$, commonly called the ›acking store, constitutes the entire memory address ›pace in which the processing unit of the computer exe-:utes the programs with no awareness of the presence ›f the intermediate levels $H_{L-1}$ through $H_1$, known vari-›usly as the buffer stores, the high speed or intermedi-ıte speed buffers, or the caches. This state of unaware-ıess of the intermediaries is known as "transparency" ›f the buffer stores to the processing unit. The function ›f the buffer stores is to hold selected pages and sub-›ages from the backing store that appear to have a ;ood probability to be called on by the processing unit .n its current processes. Thus, the memory hierarchial ›ystem possesses the full advantage of the large mem-›ry capacity and, during much of the time, allows the ›rocessing unit to enjoy the high speed service of the ›maller buffer store.

The effective average speed of the composite system is a complex function of many hierarchy structural and operational variables, among which are the capacities of the buffer stores, the page and sub-page sizes, the number of congruent classes in the certain levels, the page replacement algorithm, etc., in addition to being dependent on the nature of the specific types of programs under consideration. In the discussion that follows, the various terms will be used which have been established in memory hierarchy engineering technology. "Pages" of various sizes stands for designated fixed amounts of information transferred between various pairs of adjacent levels in the hierarchy. Invariably, larger pages are handled between higher levels. "Congruent classes" are the corresponding sub-divisions within any pair of adjacent hierarchy levels such that the page transfers between these levels are not allowed to cross the sub-division boundaries. "Page replacement algorithm" refers to the logical rule by which a particular one of the tenant pages in a given buffer store is to be determined as the replacement page, i.e., the page which shall yield its location, or page frame, for occupancy by a new page. Examples of often-discussed algorithms are the FIFO (First in First out), LRU (least recently used), and LFU (least frequently used). A system for determining the order of replacement in a hierarchy system is disclosed in U.S. Pat. No. 3,541,529. A computer memory system for transferring data between high speed local storage and one or more levels of a lower speed buffer storage level is disclosed and claimed in U.S. Pat. No. 3,588,839.

This invention introduces a new process, i.e., the path clearing for the internal operation of the memory hierarchy. The new process results in a very efficient restore operation for mature pages, i.e., those to be replaced, while avoiding the burdensome repeated restores of many premature pages as is entailed, for example, in the technique of U.S. Pat. No. 3,588,839. This new efficiency in itself is capable of improving the hierarchy system's cycle time. More importantly, the path clearing process with its associated simple hardware may then be used to establish a clear path within the memory hierarchy. Such a clear path memory hierarchy, as compared with equivalent conventional page swapping systems, offers a significantly shortened average memory hierarchy access time with an improvement in the cycle time as well. The ability of achieving superior memory hierarchy access time will become a more important consideration as the modern trend of computer system architecture points toward the use of higher and higher level memory hierarchies.

The scheme and the implementation of the "clear as needed" mode of operation and the "clear path memory" hierarchy of the invention involves reordering the same sets of elementary intra hierarchy operations as used in the conventional page swapping memory hierarchy system. A simple new device, the path pointer, is added while considerable savings within a certain logical component, i.e., the page transfer control operations, is obtained. However, this latter advantage, though substantial, is considered incidental and should not be allowed to distract one's attention from the major contribution of this invention, namely a significant shortening of the average memory hierarchy access time.

Figure 3:
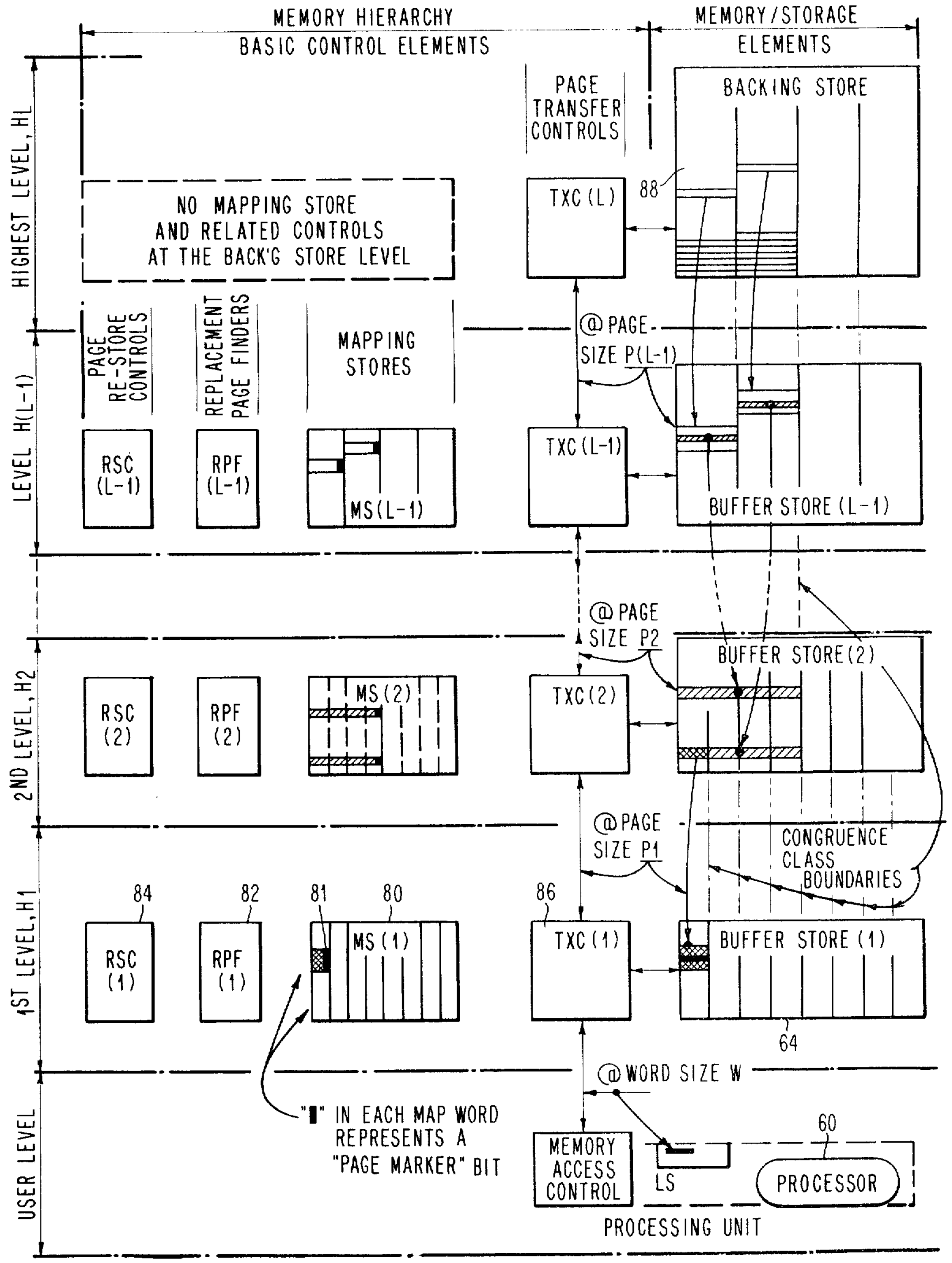
FIG. 3 is a block diagram of a hierarchial memory ystem of the invention illustrating the arrangement of ıe various memory and control elements associated /ith each buffer memory level which illustrates a pre-ɜrred specific embodiment of the invention.

Referring now to FIG. 3, there is illustrated that each buffer level of the memory hierarchy of the invention contains a mapping store 80, a replacement page finder 82, a restore control 84, and a transfer control 86. As indicated in FIG. 3, there is no mapping store, replacement page finder, or restore control associated with the backing store 88 since this memory level contains all of the information that is in processing.

The main function of the mapping store 80 is to keep track of the identity of occupant pages of all of the page frame locations in the associated buffer store 64. As the identity of each page, or each word, as the case may be, in the data processing system is carried in the address of that page, or word, in the total address space of the backing store, the "naming address" must be stored in the mapping store at the same time when the page itself is entered into the buffer store, respectively, in their one to one corresponding physical storage locations. Obviously, when a new page is brought into a buffer store to replace the old one, a new naming address is also entered to replace the old address in the corresponding location of the mapping store. In operation, when a certain page, or word, is desired by the processing unit 60, its naming address is issued by the processing unit and whereupon, depending on the system design, a sequential or parallel search of the naming address is conducted in the mapping stores of the memory hierarchy. Upon conclusion of the address search, the lowest level mapping store among those responding positively will either initiate the forward page transfer operation or enable its associated transfer control 86 to execute a requested read or write operation if it is the responder transfer control. This will be further explained in the description as follows. For the physical implementation of a mapping store, the most desirable approach is by the use of an associative memory, which possesses content addressability as the above described application calls for. On the other hand, a fast store with a built-in automatic sequential search facility will also serve the purpose. Both approaches have been used in conventional memory hierarchy systems.

A second functional facility is built into the mapping store 80. It is the "page marker" used in a nonstore through memory hierarchy system. It is simply a special storage bit in each map word indicated in mapping store 80 at level H-1 by darkened area 81. A logic one is stored into this page marker bit whenever a new or updated information is stored in its associated tenant page. The logic one is replaced by a logic zero whenever the content of its appertaining tenant page is restored or stored back into the proper parent page resident in an appropriate higher and usually next higher level of the memory hierarchy. In a page replacement operation, the outgoing page must be cleared of the mark before it can be cast out by the new page.

The function of the "replacement page finder" 82 is to point out the physical location, i.e., the physical address of a tenant page which is the next to be cast out of the associated buffer store when a new page is to be brought into a fully occupied buffer store level. The rules for determining replacement pages in the buffer stores can be any of the various page replacement algorithms mentioned earlier and need not be uniform throughout the memory hierarchy. It is understood that during the initial filling in phase of the buffer store, no page replacement is involved and the replacement page finder simply points to the next available page frame until the buffer is filled. The physical implementation of a replacement page finder ranges from a simple shift register for the first in first out algorithm (FIFO), to the sophisticated bi-loop bidirectional shift register for the least recently used algorithm (LRU), and the use of activity lists with the help of simple programs for either the LRU or the least frequently used algorithm (LFU). Since the details within a replacement page finder are not relevant to the present invention, it suffices to note that these apparatuses are available and are being used or proposed for use in conventional memory hierarchy systems.

The page "restore control" 84 is responsible for intra-hierarchy restore operation. It initiates a restore request and an address search request upon detecting the presence of a logic one in the page marker 81 of the page frame location pointed to by the replacement page finder. It also supplies the naming address for the searching operation. The naming address searching is carried out in much the same way in the various upper level mapping stores as when the search request is made by the processing unit; the difference being that only hierarchy levels above the requesting level will be activated. This feature is implemented by the use of an address switch 42 (FIGS. 5A and 6A) and a request signal OR-ing circuit as will be explained in detail in the specification that follows. The page restore control 84 also causes setting and resetting of the page marker 81 in the mapping store 80 upon completion of a page restore, or store back, operation.

The primary function of the page transfer control 86 in the basic memory hierarchy is to establish a data path between its associated buffer store 64 and an adjacent page transfer control in either the upper or the lower level. In a more advanced memory hierarchy however, page transfers between selected non-adjacent hierarchy levels may be designed into the system. In any case, this data path usually includes an appropriate amount of buffer registers to serve as a means for matching the different data path widths and speeds of the hierarchy levels in communication. Error control code equipment (ECC) can also be considered a part of the page transfer control 86. When any two page transfer control elements are engaged in a page movement transaction, one of them acts in the role of the transfer initiator and the other a responder. With respect to the processing unit, the first $H_1$ buffer memory transfer control is always in the position of a responder.

There are two occasions on which a transfer control will be prompted to initiate an intra-hierarchy page transfer: (1) for any transfer control other than a responder when its associated mapping store finds itself to be the lowest level mapping store that responds positively to an address search request, and (2) when its associated page restore control finds it necessary to initiate a page restore operation. In both instances, the responder to the new request is always asked to accept information from the new initiator transfer control. Thus, an intra-hierarchy page transfer request always implies a write request to the responder.

Referring now to FIGS. 1 and 2, specific page transfers from high levels will be explained to illustrate the difference in procedure between the page swapping technique illustrated in FIG. 1 of the prior art and the clear as needed technique of the invention as illustrated in FIG. 2. As a prelude to the illustration, assume that the processing unit communicating with the buffer level $H_{i-3}$ has requested information located in frame $F_A$ in a high level $H_i$ (which could be the backing store level). In order to supply the information to the lower buffer level $H_{i-3}$, the data in frame $F_A$ will be transferred to frame $F_B$ in the next lowest level, forward to frame $F_C$ in the next forward lower buffer level $H_{i-2}$ and finally to frame $F_D$ in the buffer memory level in which the central processing unit can access the information. In the page swapping procedure, only the adjacent lower and forward buffer memory level is directly involved at a given interchange with the forward and rearward transfer of information, although many levels can be involved in clearing the frame so that the desired information can be transferred forward. Referring now to FIG. 1, a page replacement algorithm is executed in the mapping store associated with the buffer level $H_{i-1}$ to locate the most expendable page frame which can be made ready to receive binary data from the adjacent upper level from frame $F_A$. If the data contained in frame $F_B$ contains a "mark" which indicates that is is altered, the parent page in the upper level must be updated before the information in frame $F_B$ can be erased by reading into it the information from frame $F_A$. Step 1 indicates this secondary transfer of information. Step 2 indicates the reading into frame $F_B$ that certain portion of the page in frame $F_A$ which contains the information called for by the central processing unit. Assume for the sake of simplicity that the frame $F_C$ selected by the page replacement algorithm associated with the buffer store is not marked. Then the information from frame $F_B$ can be read directly into frame $F_C$ as indicated by Step 3. At the next lower forward level, $H_{i-3}$, let us assume that the expendable information in frame $F_D$ contains a mark which means that the parent information somewhere in the upper levels of the memory hierarchy must be updated before the information can be erased. A search in the mapping stores of all the upper buffer levels in the memory hierarchy may indicate that the parent page 70 for the data stored in frame $F_D$ is located in level $H_i$. This information must be brought forward into the buffer level $H_{i-2}$ so that the updated information in frame $F_D$ can be preserved. In order to transfer the data page in frame 70, the lower intermediate buffer level $H_{i-1}$ is requested to supply an expendable page frame 71 to receive the information. When page frame 71 contains marked information, it must first be transferred upwardly to its parent page in backing store level $H_i$ as indicated by Step 4, whereupon the information in page frame 71 can be transfered forward as indicated by Step 5. Buffer memory level $H_{i-2}$ is then requested to provide a page frame 72 to receive the parent page now residing in page frame 71 of buffer memory $H_{i-1}$. Again, a search is made in the hierarchial memory and assume that the parent page for the information now residing in page frame 72 resides in the backing store page frame 73 in memory level $H_i$. Finally, the The lower buffer memory level $H_{i-1}$ is again requested to provide an expendable page frame 74 to receive the parent page of information from frame 73. When the information in frame 74 is marked, it must be first transferred upwardly as indicated by Step 6 to update its parent page. The parent page contained in frame 73 is then moved forward as indicated by Step 7. The marked page now residing in frame 72 can be transferred upwardly to update the information in frame 74 as indicated by Step 8. The page in 72 is erased when the information in frame 71 is moved forward as indicated by Step 9. Now the parent page for the information residing in frame $F_D$ is located in the buffer memory level located immediately above and adjacent thereto and the marked page can be read into the parent page as indicated by Step 10. Finally,the page of information containing the data initially requested by the central processing unit can be transferred forwardly from frame $F_C$ to frame $F_D$. The primary movement of data within the hierarchy memory is from frame $F_A$ to $F_B$ to $F_C$ to $F_D$. The remaining data transfer operations involve secondary movements which are necessary to clear the path for the primary forward transfer of data. Note, also, that with the exception of Step 1, all of the secondary movement of information was required to vacate or make available page frame $F_D$ for a single primary forward transfer of data from the next highest buffer memory level.

Referring now to FIG. 2, there is illustrated a procedure for advancement of information within a hierarchy level by the basic path clearing procedure of the invention, which is also utilized in the more advanced clear path memory hierarchy system. In this procedure, the advancement of the primary page movement called for by the computer is held back while the clearing of the page marks in the selected path is carried out. The replacement page finders 82 associated with each of the buffer memory levels concerned will be simultaneously actuated. The result is the instant definition of the entire main path for the primary page movement, although not all the steps in this path are yet cleared of page marks for free passage. The same set of page restore requests will be made as would be made in the conventional system and likewise these restore requests will be handled one at a time in the descending order of the hierarchy levels. However, by withholding the primary page movement until the entire path is cleared, an important facility is opened up for the entire page restore operation as explained below. In essence, the page clearing operation is facilitated by utilizing the path obtained by withholding forward transfer of the primary page data.

In the following illustration, assume that the same conditions are present as discussed in regard to the illustration in FIG. 1. Let the information called for by the processing unit be located in page frame $F_A$ in the backing store level of the hierarchy level $H_i$. The path selected by the replacement page finders in the various hierarchy memory levels will be $F_B$, $F_C$ and $F_D$, at memory hierarchy levels, $H_{i-1}$, $H_{i-2}$ and $H_{i-3}$, respectively. For the sake of illustration, assume that the contents of page frame $F_B$ and $F_D$ on the aforementioned path contain marked pages, whle page frame $F_C$ is clear of page marks, as was the case in the illustration of FIG. 1.

The path clearing process begins with the uppermost page frame that needs clearing, i.e., $F_B$ in the buffer memory level immediately below level $H_i$. To simplify the description of the overall restore events, it will be assumed that $H_i$ is the highest level of the memory hierarchy in this illustration. Since $H_{i-1}$ is immediately below the backing store level $H_i$, which contains all of the data, no restore address search is necessary for restoring the information in frame $F_B$ and the restore action can be carried out immediately, as indicated by Step 1. Upon completion of Step 1, the page mark in frame $F_B$ is cleared. Now both frame $F_B$ and frame $F_C$ are clear. The next operation involves clearing the marked page in frame $F_D$. Page restore control issues a restore request and initiates a restore address search. Three different situations may occur at this point, namely: (a) the closest available source page is found at a level below $H_i$ and off the main path, (b) the closest available source page is found somewhere on the path, for example, in frame $F_C$ or $F_B$, and (c) no available parent page is found through the address search. In this last case, the only available source page must be in the backing store level which in this illustration is level $H_i$ which situation compares to that of FIG. 1. Under the situation described in (a), if the closest source page is in the immediate upper level, i.e., $H_{i-2}$, then a simple page restore indicated by Step X in FIG. 5 is all that is necessary to clear frame $F_D$. Under the same conditions except that the closest source page is at a higher level such as frame 75, then the already cleared path between level $H_{i-1}$ and frame $F_D$ can be used for the necessary forward bridging as indicated by the Step Y. After this bridging movement, the content in frame $F_D$ may be restored into its source page now residing at frame $F_C$ whereupon $F_C$ becomes marked. This new page now residing in $F_C$, however, is not called into this hierarchy level $H_{i-2}$ by a processing unit demand but is rather called in by a restore request to serve as a bridging element. According to the page replacement philosophy, such a page should be regarded as a mature one. In any case, there is no reason for upgrading this new page that is the one now in frame $F_C$ in the page priority stack of the hierarchy level. Thus, even though $F_C$ contains a new and updated page, we still consider this tenant page the most dispensable as compared with all other tenement pages in this level. This means that $F_C$ remains a step on the current path and therefore should be cleared of its newly acquired page mark. This last mentioned need can be met most readily, as its source page now resides in the adjacent higher level from which the subject page in $F_C$ has been transferred downward to serve as a bridging unit. The above situation and hence, the resultant necessary simple restore operation shall repeat themselves a few times in the case of an extended bridge with more than one span. Note that the bridging pages and the subpages will be naturally lined up to facilitate the sequence of restore so that the page mark is passed back along the bridge path section until it finally is pushed out of the way at its upper end, as shown by Steps $Z_1$ and $Z_2$. In situation (c), wherein the only available source page is located at level $H_i$, the entire section of path $F_B$ and $F_C$ will be used for forward bridging and backward restores as shown by the sequence of Steps 2, 3, 4, 5 and 6. A comparison with the procedure described in FIG. 1 which depicts the same main path condition, indicates a more efficient data transfer routine involving fewer steps and fewer disruptions to the intervening buffer memory levels due to the requirement of providing expendable page frames for secondary transfers.

As may be appreciated, the main advantage of the path clearing procedure of this invention over the path swapping scheme illustrated in FIG. 1 is the repeated usage of the partially cleared upper section of the path. Such a facility eliminates the need of finding and clearing other secondary paths. In other words, in the path clearing process, there are secondary page movements but no need of secondary off the main path. The main path is the only path, except for the push-out one-steps at the upper extremes of all store back movements. The simplified operation results in significant performance improvements over the conventional scheme.

Figure 5A:
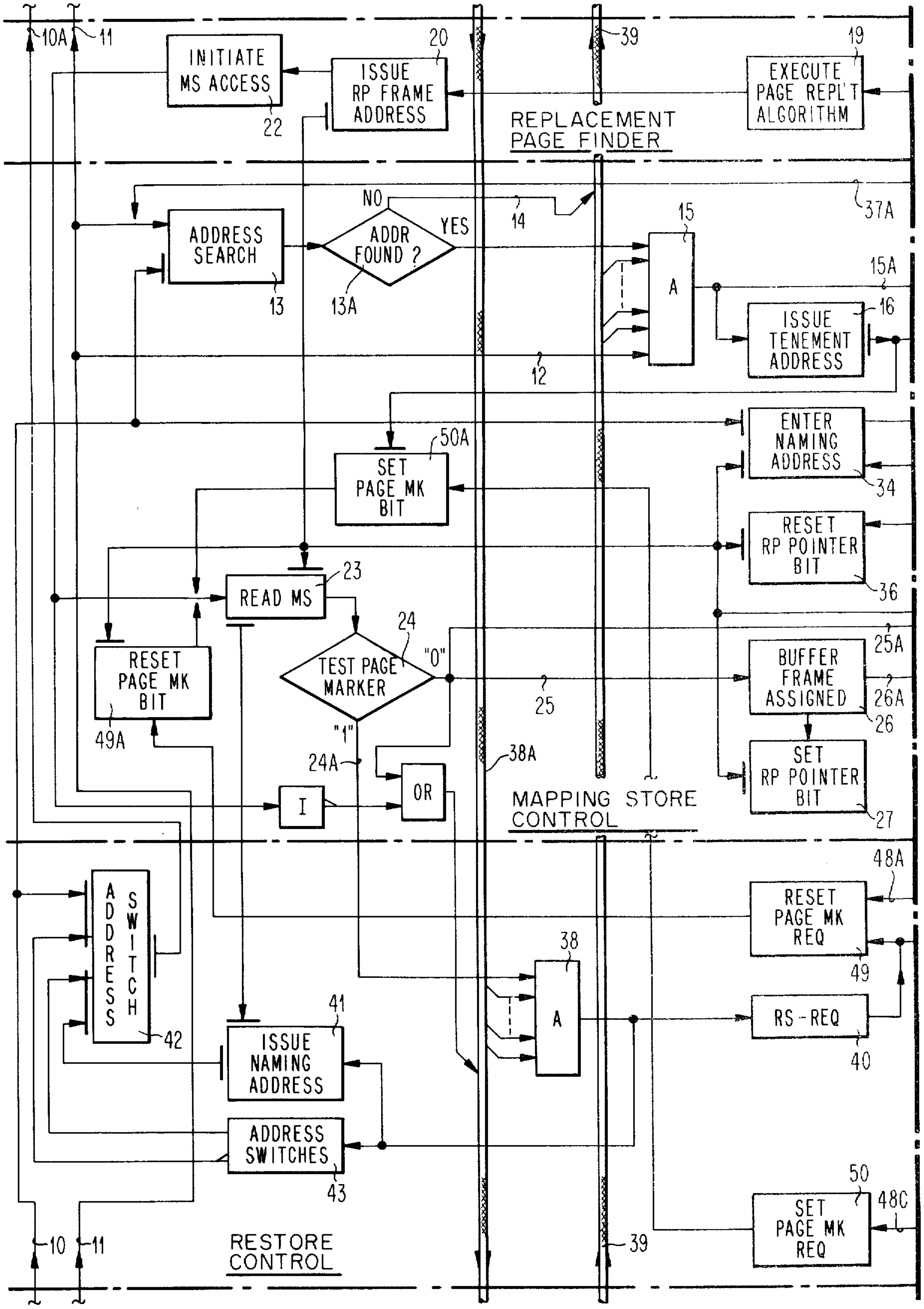
FIGS. 5A and 5B are block diagrams illustrating the ction and decision elements associated with a single uffer memory level of a preferred embodiment of the ıvention.
Figure 5B:
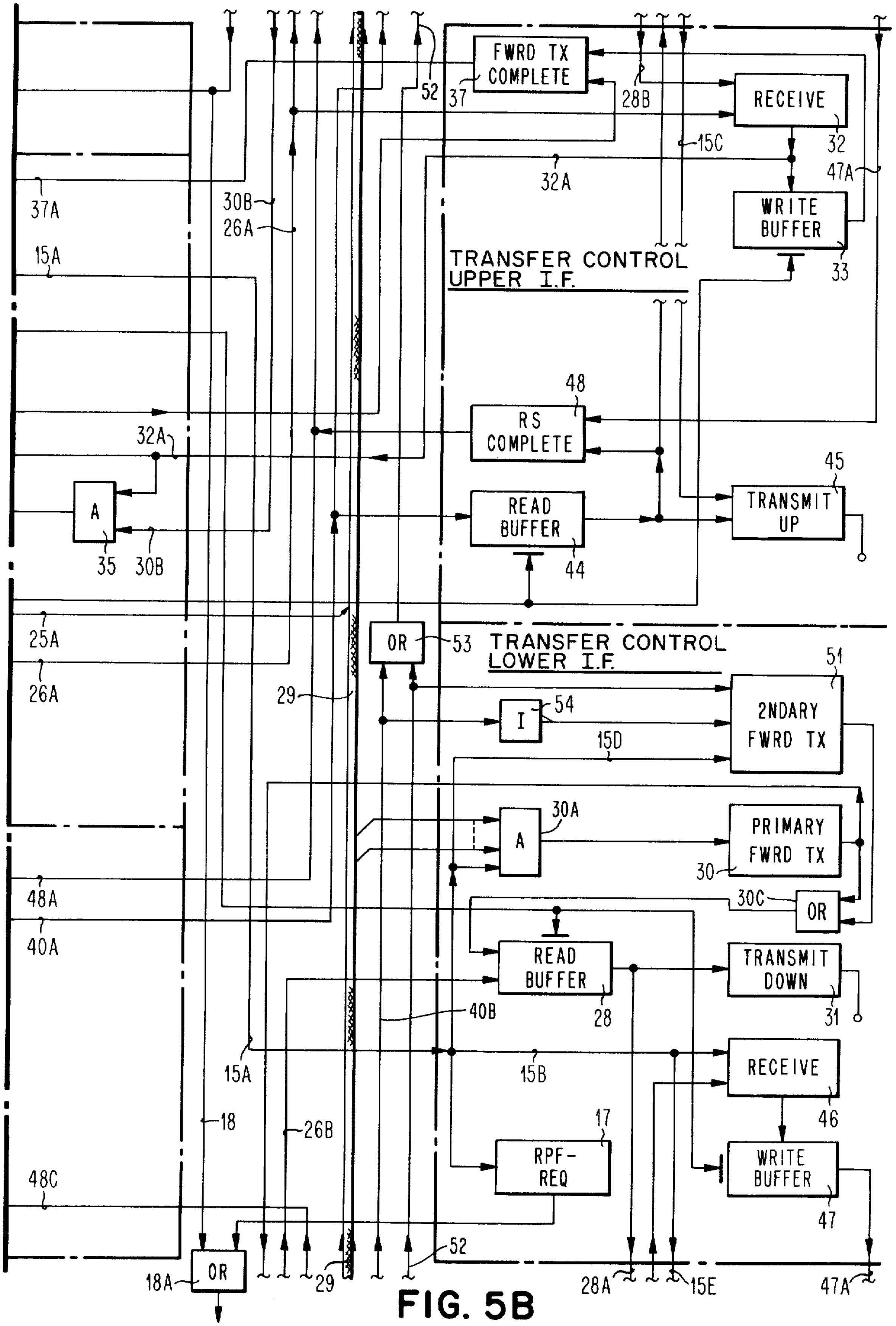

Referring now to FIGS. 5A and 5B of the drawing, there is illustrated a preferred specific embodiment of a control apparatus for a single buffer memory level for a clear as needed memory storage hierarchy mode of operation. In operation, the processing unit of the computer issues a request for a segment of data. The address in the backing store of the needed data is transmitted to all levels of the memory hierarchy on line 10. Simultaneously, a command order to search all the mapping stores in the various memory hierarchy levels is given on line 11. The backing store address of the data segment needed by the processing unit is passed on to upper levels of the hierarchy through address switch 42 through line 10A. At the hierarchy level illustrated in FIGS. 5A and 5B, proper portion(s) of the address of the data segment and the command are inputted to address search block 13 in the "mapping store and control" section of the apparatus. When the search is complete, the result goes to decision box 13A. If the requested information is not present in the mapping store, decision block 13A inputs a signal on line 14 to cable bundle 39 and the searching action at the hierarchy level ceases. However, if the data address is found in action box 13, a signal is transmitted to AND block 15 in the mapping store control section of the hierarchy control. The signal from 13A is combined with signals from the underlying hierarchy levels from cable bundle 39 which indicate that the address searches in the underlying levels were unsuccessful. These signals accompanied by the search order from line 12 result in the issuing of a command from AND box 15. This memory level will be referred to as the responding level. A signal is sent to box 16 causing it to issue the tenement address in the buffer memory of the page frame that contains the requested data segment. Also, a signal is sent on line 15A to the "lower interface transfer control" to box 17 which results in the issuance of a request to the lower forward hierarchy level to find a replacement page frame to accept the transfer of the data from the responding level. This signal from box 17 is sent to line 18 through the parallel RPF request logic box 18A. In all the receiving hierarchy levels below the responding hierarchy level, the signal from block 17 is passed downwardly on cable 18 to action block 19 which causes the replacement page finder apparatus in each of the lower hierarchy levels to execute a page replacement algorithm to determine the most expendable page in the respective buffer memory which can be cleared to receive the requested data from the responding level. This action can be followed if one assumes that the receiving level is identical to the responding level depicted in FIGS. 5A and 5B. The signal from box 19 is passed to box 20 which issues a replacement page frame address and also an order to box 22 to initiate a mapping store access command. The order from box 22 goes to the mapping store to box 23 which examines the page frame so addressed to determine if the data therein has a mark, i.e., that it has been altered at some time which requires that the parent page be updated. Decision box 24 detects whether a page marker is present on the information contained in the replacement page frame selected by the replacement page finder box 19 and initiates the proper action. If no marker exists, a signal is sent on line 25 to assignment box 26 which assigns the buffer frame selected to receive the information from an upper hierarchy level and acts as a data path step. Simultaneously, a signal on line 25A is inputted into cable bundle 29 which will be transmitted to the upper levels to indicate that the reporting lower level is clear and is set to receive a page of information. A signal from box 26 is sent to box 27 which has previously received the address of the replacement page frame to set the replacement page pointer bit. Box 26 in mapping store control sends a signal on line 26A to the upper responding memory level line 26B to the transfer control lower interface to action box 28. This serves as one input which prepares the next upper level to read an information from the buffer in preparation for transmitting down to the next lower or forward level of the hierarchy. This action will not take place until a second command is made to box 28. It is important to note at this point that in the transfer control apparatus of each hierarchy level, as indicated in FIGS. 5A and 5B, a distinction is made between primary forward transfer of data handled by action box 30 and secondary forward transfer of data handled by action box 51. Assuming that all levels below the responding hierarchy level report successful assignment of replacement page frames on the cable bundle 29, then at the requesting level, that is the original responding level that detects the presence of data requested by the central processing unit in its associated buffer store, the signal from AND box 15 on line 15A now combines with all positive responses from cable bundle 29 at the AND box 30A to initiate a primary forward transfer order from action box 30. The command from box 30 is sent through OR box 30 C to block 28 which combined with the signal from 26B causes the page of information of the address received from 16 to be read out of the buffer as indicated by box 28. The signal from box 28 on line 28A notifies the immediate lower level on line 28B to receive the information from the original level which is now prepared to transmit data down to the lower level. The signal from box 28 is transmitted down to the action box 32 of the lower level. The signal from box 28 enables the action block 31 to transmit the page of information down to the lower level now ready to receive same. Upon completion of the transfer of primary data to the upper interface of the transfer control of the receiving level of the buffer memory hierarchy, the received information is put into the buffer store as indicated by action box 33. When the page of data is received, a signal from box 32 is transferred on line 32A to box 34 in the mapping store and control apparatus of the hierarchy memory. This has the effect of entering the naming address of the received page of data into the mapping store for record keeping purposes. The naming address, which is the backing store address of the desired information, is received from line 10B in box 34 and the frame address in the mapping store is received from action box 20. The signal from 32A is also inputted to AND box 35 along with the signal from 30B. When box 35 receives both signals, as it now does, an order is sent to box 36 causing it to reset the replacement page pointer bit in the mapping store, A signal 34A is also sent from box 34 to box 37 of the same level. This signal, together with signal 33A upon completion of write buffer action 33, causes box 37 to send a signal to the mapping store on line 37A which will result in a change of finding by box 13A from a "no" to a "yest". In primary transfer of data forward, this development sets the stage for transfer of the data to the next lower level, and further on down until the lowest level is reached.

However, in the event that decision block 24 reports a mark on the replacement page frame address selected to form the path for transfer of data, a signal is sent to AND box 38 on line 24A. Cable bundle 39 contains signals from all the upper hierarchial memory levels, which signals signify that no restore operations are needed at the upper levels. When the logically positive signals from all the upper levels are combined with the logically positive signal on line 24A in the restore ordering control box 38, box 38 will initiate a page restore requirement of box 40 and simultaneously send a command to issue naming address box 41 which will issue the backing store address of the information in the replacement frame selected by the box 19 through address switch box 42. The signal from AND box 38 also activates address switching mechanism 43 so that the naming address from box 41 is substituted for the address on line 10A which had originally been the same as the address on line 10.

At this point, one should note that the condition arrows on the lines leading to address search box 13 and read mapping store box 23 indicate that the signal on the line may or may not change the associated decision box depending on the original condition.

The restore request emanating from box 40 also initiates read buffer box 44 through line 40A in preparation for upward data transmission necessary to clear the mark on the selected page frame. Transmission of information up from box 45 waits for signal from line 15C which must eventually come from the immediate upper level from AND box 15 which indicates that the parent page of data has been found at that level. Simultaneously, the "receive" box 46 in the upper level is activated by a signal from box 44 in the lower level and from a signal in line 15B from AND box 15, and the transmission is carried out. Following the transmission, the write buffer box 47 order is carried out and the information is entered into the buffer level memory. The restore complete box 48 order is activated by a signal from 47A in combination with a signal from box 44. The signal 48A from box 48 triggers the "reset page mark request" box 49 in the requesting level, while simultaneously signal on line 48C of the upper (receiving) level, also from box 48, via line 48B, triggers the set page marker request 50 of that level. These requests will be honored by the mapping stores when the signals are sent to reset page mark bit box 49A from box 49 and set page mark bit box 50A from box 50 in their respective levels. Thus, at the responding level, the mapping store index is brought up to date by changing or retaining the bit marking the information newly stored in the receiving buffer level. In the event that the signal from responding level to restore request box 40 is located at least one level removed and above the requesting level, its AND box 15 presents a signal 15D to the secondary forward transfer box 51 in its lower interface transfer control. Simultaneously, signal line 52 carries the order from the restore request level through an OR box 53 of the intervening levels to box 51, as a second input thereto. A third input to box 51 in the responding level comes from the non-active restore request box 40 in the restore control at the immediate lower level through line 40B and inverter box 54.

When all three conditions imposed by the three inputs to box 51 are met, the secondary forward transmission is ordered by box 51. The actual transmission follows the same steps as described previously relative to the primary forward transmission. Note that unlike the primary forward transmission, box 30, the secondary forward transmission box 51 does not issue a signal equivalent to signal 30A or 30B to the AND box 35 to the immediate lower level to effect the setting of the replacement pointer bit box 36 of the receiving level.

The aforedescribed process secondary forward operation will repeat until the proper parent sub-page is brought down to the intermediate level above the restore-request level. At that point, the secondary-forward movement is complete.

Figure 4:
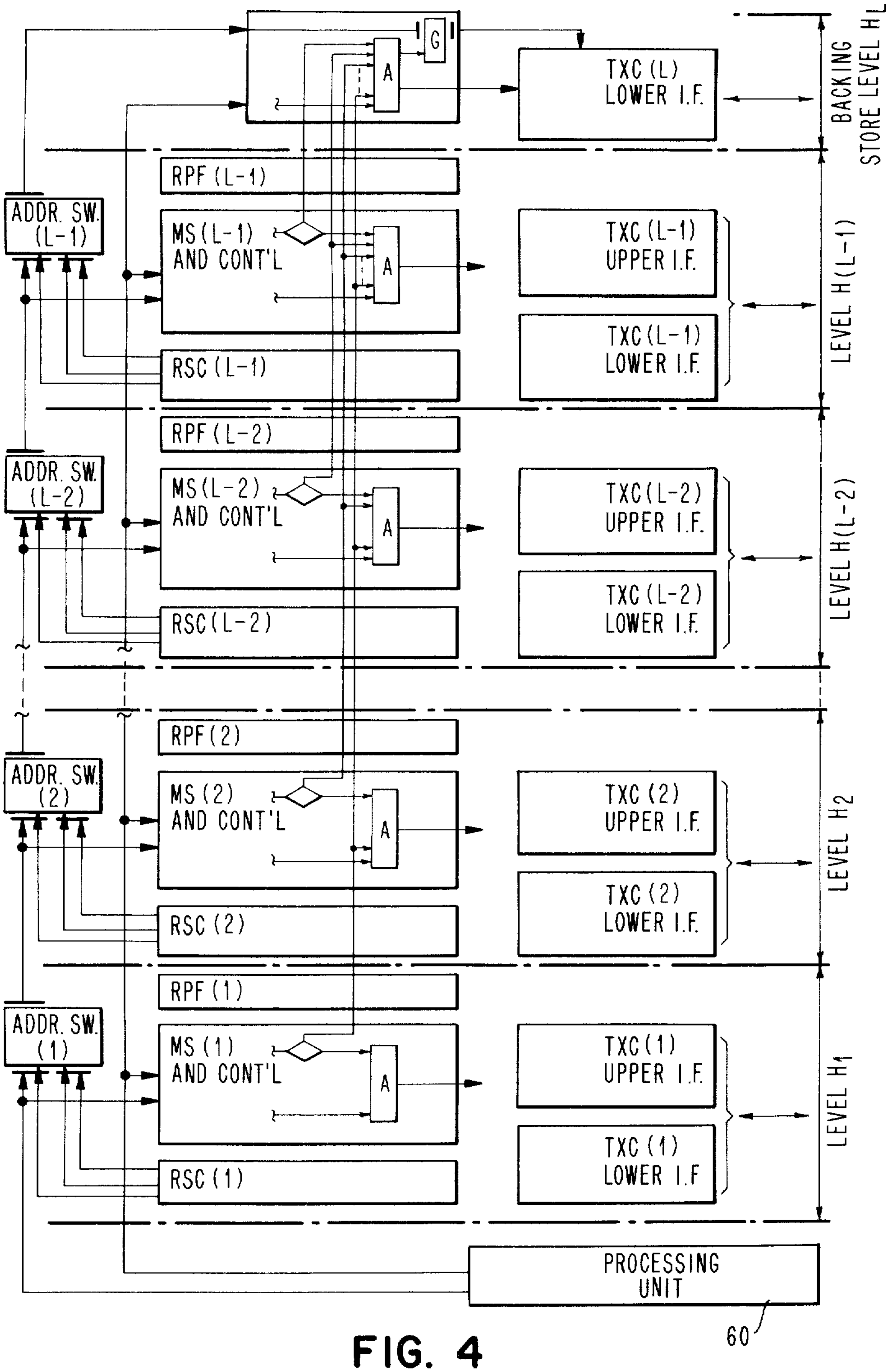
FIG. 4 is a more detailed block diagram of the hierar-hial memory system of the invention illustrating in art the association of the various memory and control lements therein and in particular the formation and ıe use of one bundle of control lines.

In FIG. 4, there is depicted the arrangement of a plurality of levels of a hierarchy control mechanism. As indicated, a processing unit 60 has a line 10 that communicates with all of the levels of the hierarchy memory through address switches 42. Address switching box 43 in the restore control apparatus of each level controls the operation of address switches 42. Any given level in the memory hierarchy can substitute a new address of a data segment or page through address switch 42 which will be transmitted to all levels of the memory hierarchy above the activated switch. This action comes into play when a marked page must be restored to the parent page in one of the upper levels of the memory hierarchy in order to clear the page frame to provide a path for primary or secondary transfer of data. Also shown in each of the mapping store and control apparatus of each level is the decision block 13A and its association with AND box 15 and the cable bundle 39 that runs throughout the levels of the memory hierarchy and are connected to the AND box 15 at each of the levels. The other two cable bundles 29 and 39A in this system and their respective association with the AND boxes 30A and 38, follow the same idea. However, these are not shown in FIG. 4.

The clear as needed memory hierarchy system of this invention differs from the conventional page swapping memory hierarchy system by the following additions and modifications. Means are provided for transmitting orders for parallel operation of all the replacement page finders below the level of the requesting page transfer control, that is below level $H_i$ in the illustrated example in FIG. 2. This can be implemented by a set of OR logic gates 18A on line 18 coupled with a replacement page finder request block 17 as shown in FIG. 5B, or some equivalent structure.

Means are also provided for registering the identity of all the replacement page frames in the newly defined path through the memory buffer levels. This is more simply provided by including a replacement page pointer bit in each word of the mapping store similar to the page marker bit. Only the one identified page frame has its pointer bit set to a logicial one in the replacement page pointer field. In the subsequent access of the buffer store during the forward transfer of the prime page and its sub-pages, the addressing is simply accomplished by an associative search for the unique one pointer bit in the single bit replacement page pointer field. In operation, the replacement page pointer bit is set to one by its asssociated replacement page finder at the time when its pertinent tenant page is identified as the next replacement page and is found free of a mark. It is set to zero when the pointed page frame is taken up by a new page during the primary forward page movement, that is, the forward page movement subsequent to the completion of the page clearing operation. The logic responsible for thtis operation is shown as boxes 35 and 36 in FIGS. 5A and 5B. Another feature of the clear-as-needed memory hierarchy of this invention is that a means for establishing the order of the restore-request from the various levels is provided. This is again easily implemented by a set of AND gates shown as the restore ordering control box 38 in FIG. 5A. Notice that any one restore control will not act until all upper level page marks have been reported cleared. Another feature is that a means for forward page transfer authorization is provided. There are two distinct occasions for authorizing forward page transfers, namely (1) a secondary forward page transfer from a certain level $H_k$($k$ greater than 2) is authorized when there is a restore request made at any level below $H_{k-1}$ and that $H_k$ is the lowest positive responding level to the restore address search request. Shown in FIG. 5B, the AND logic implied at the input flow of the secondary forward transfer box 51 and the inverting logic gate 54 preceding the box gives a representative scheme for accomplishing the desired control. A second occasion is when a primary forward page transfer from a certain level $H_k$ is authorized when $H_k$ is the lowest positive responding level to the primary address search request and that a clear path is found to exist between the levels $H_{k-1}$ and $H_1$ inclusive. The associated AND logic 30A preceding the primary forward transfer box 30 in the transfer control apparatus for a typical level, also shown in FIG. 5B, will exercise the desired control. Another distinction between the clear-as-needed control of the invention and page swapping is that, in the case where queuing is implemented, the means for queuing the operations at each hierarchy level will now be simplified. Unlike the page swapping memory hierarchy, the clear-as-needed memory hierarchy of the invention requires only a length of two queuing apparatuses at each transfer control. This simpler requirement may be deduced from an examination of the queue conditions at each level of the illustrated case in FIG. 2. For instance, at the $H_i$ level, the movement in Step 7 is the only pending operation prior to any of the movement Steps 1, 2 and 6. At the $H_{i-1}$ level, no queuing is experienced in the illustrated case. Movement Step 7 has not been requested of the $H_{i-1}$ level until the time when the actual movement is authorized. All other page movements through this level also constitute a simple sequential operation.

Figure 6A:
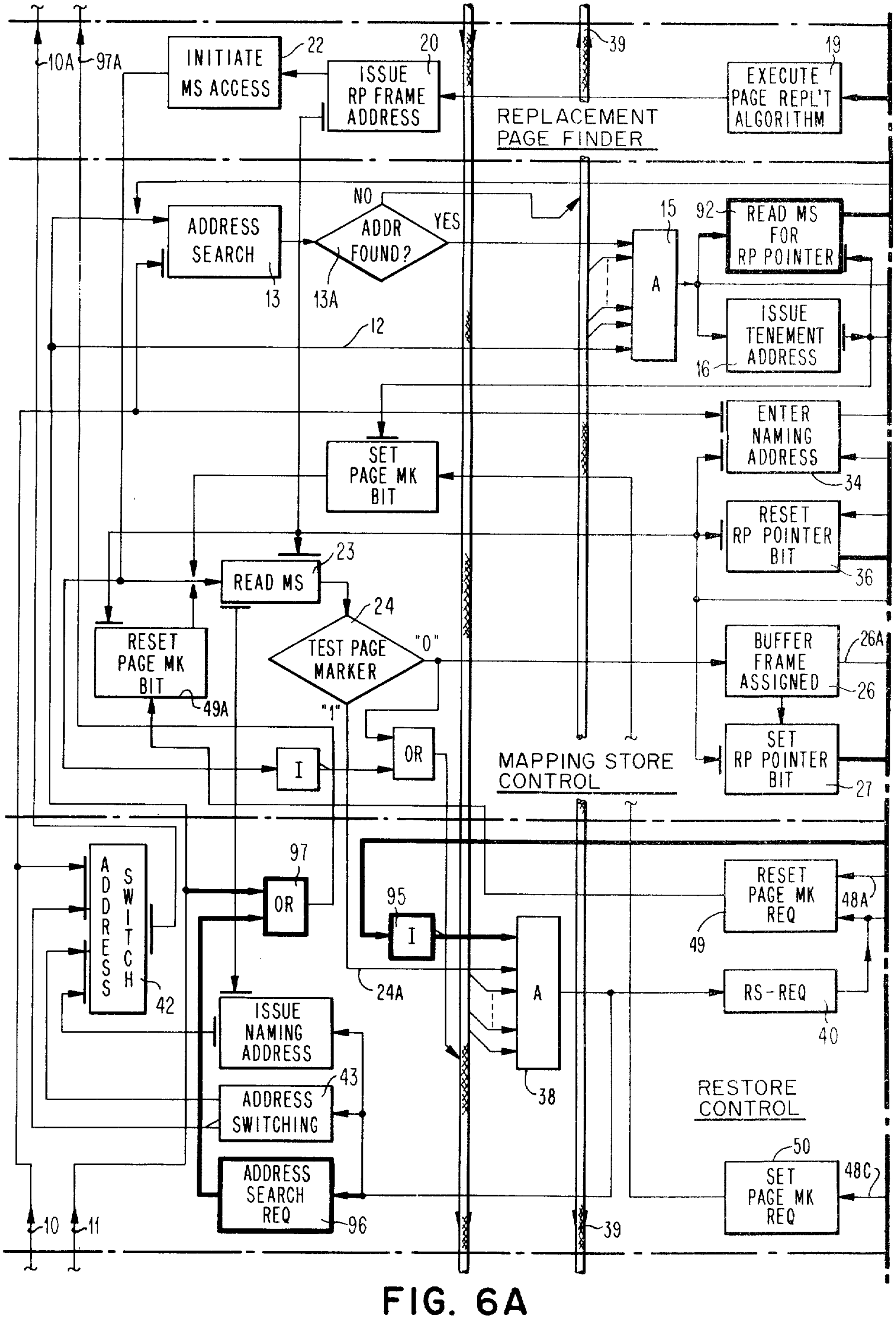
FIGS. 6A and 6B are block diagrams of the action nd decision blocks of a buffer memory level of the hie-archial memory system of the invention illustrating yet nother preferred specific embodiment thereof.
Figure 6B:
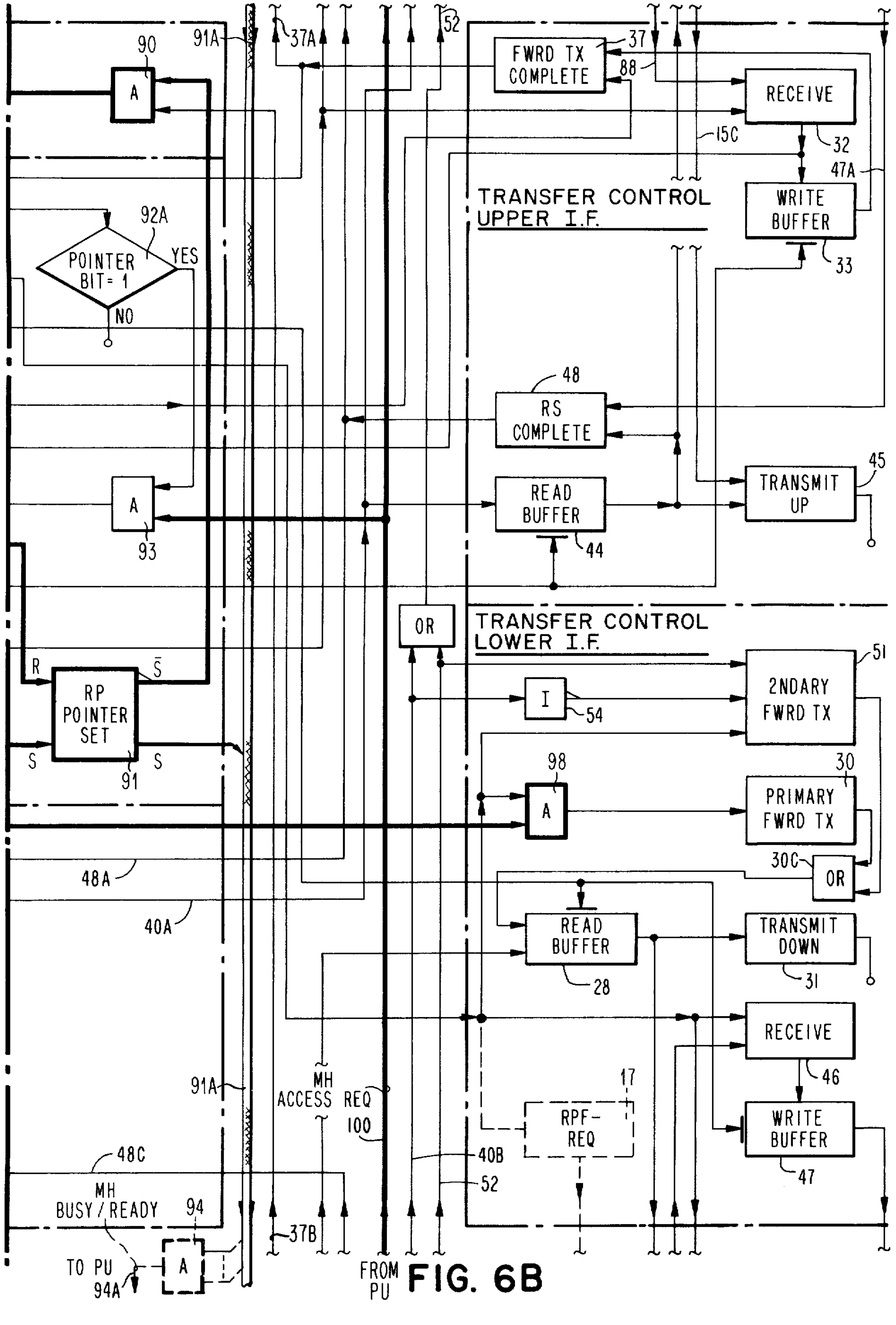

Referring now to FIGS. 6A and 6B, there is illustrated another preferred specific embodiment of the improved memory hierarchy system of the invention. The embodiment illustrated is called the "clear-path-hierarchy" memory system. The principle difference between the afore-described clear-as-needed memory hierarchy and the clear-path-hierarchy is that in the clear-path-memory hierarchy system a full length clear path through the entire length of the hierarchy memory is always made available prior to the time when the processing units memory access request is accepted. In contrast, in the clear-as-needed memory hierarchy, the subsequent path through the various levels of expendable page frames is formed only after a request is made by the processing unit. Further, a path is established only between the level containing the requested informatioin and the lowest forward memory level and the path is obliterated completely by the primary forward transfer of the pages containing the requested data. As is indicated in FIGS. 6A and 6B, the same basic structure utilized in the clear-as-needed memory hierarchy can be utilized in the clear-path-hierarchy memory system. The additions to the system required for the clear-path-hierarchy are indicated by heavy solid lines and the deletions by light dotted lines. The access mechanism to the formation of the path through the hierarchy levels is through the use of the replacement page pointer bit in the mapping store as described in the clear-as-needed system. With the clear-path-hierarchy system, every memory access request will be answered immediately since the path is established automatically after the previous request is fulfilled. Only two types of operations will be involved: the parallel address search at all buffer levels, and the sequence of unimpeded primary forward page transfers. The latter covers only a length of the lower path as the result of the address search may dictate.

Since there is no waiting in executing the objective operation, the immediate advantage of the clear-path-hierarchy system is obviously the attainment of the minimum achievable average memory access time for a given program and a given set of hardware performance figures. In the clear-as-needed system, the path is cleared immediately following the request for information by the processing unit not contained in the immediately accessible memory level. Following the primary address search and the clearing of the path which will consume, respectively, average lengths of time X and Y, the information requested is transferred forwardly to the lower level which will consume a length of time Z. The total response time for the clear-as-needed system is thus X + Y + Z. However, in the clear-path-hierarchy, a request by the processing unit for information stored at an upper level in the system is honored immediately. The time for searching and for primary forward transfer of the information should be approximately the same as in the clear-as-needed system, i.e., X and Z, respectively. The total time between the request by the processing unit and the response is thus X + Z. Following the response by the system, the path in the hierarchy system is reestablished automatically which would take time Y'. However, the time used to reestablish the path would ordinarily not hold up or delay the processing unit since the hierarchy system path clearing operation can be made to go on simultaneously while the computer is engaged in other operations. Moreover, in general, $Y' < Y$ because of the presence of an un-used upper clear path to aid in the path reestablishment operation.

In operation, the clear-path-hierarchy memory will form a path through all of the levels of the memory hierarchy. However, a transfer of page requested by the processing unit from one of the lower levels will consume only the lower portion of the path, leaving the upper unused portion intact. Following the primary forward data page transfer, only a path through the lower levels need be reestablished. The automatic initiation of the process for reestablishing the path section is simply implemented by substituting the parallel replacement page finder request logic block 17 of FIG. 5B with the replacement page finder auto-start logic 90 and 91, as illustrated in FIG. 6B and will be explained more in detail.

In the clear-as-needed system, the page replacement algorithm action box 19 was initiated by the replacement page finder box 17 of the transfer control through OR logic box 18A and cable 18 of the upper hierarchy level. However, in the clear-path-hierarchy, the page replacement algorithm box 19 is automatically initiated by the RPF auto-start logic boxes 90 and 91 which in turn are actuated by the reset replacement page pointer bit box 36 in the mapping store of its own level.

Referring now to FIGS. 6A and 6B, after completion of a primary forward transfer of a data page, the output of box 37 communicates with the mapping store, more specifically boxes 13 and 13A. As a consequence of the action of box 34, the address of the newly received page is now detected by box 13 and the decision of box 13A is changed from a no to a yes to indicate the presence of a desired new page. The clear-path-hierarchy system is provided with a read mapping store for the replacement pointer box 92 which is actuated from AND logic box 15 in response to signals from the address search request line 12, cable bundle 39 and decision box 13A. Box 92 acts on a signal from block 15 and the address of the page from block 16. If the response from decision block 92A is no, no further immediate action at that level will take place. If the response is yes from box 92A and the forward transfer was a primary one, then box 93 will issue a signal to cause reset of the replacement pointer bit box 36. Obviously, the signal from 92A must also be accompanied with a signal from the processing unit on line 100 which is necessary to actuate box 93. The register box 91 is reset by a signal from box 36. The output of box 91 will get AND logic box 90 ready to execute the replacement algorithm pending arrival of a signal 37B from box 37 of the immediate lower level. The execution of the page replacement algorithm by box 19, and the action of boxes 22, 23 and 24 will result in detecting whether or not relevant page marker bits are one or zero as explained in relaltion to FIG. 5A. If the page marker is a zero indicating that no marks or updated information is contained in the page frame under consideration, a buffer frame is assigned by box 26 and a replacement page pointer bit set in the mapping store by box 27. THis action marks the selected page frame as a step in the path for transferring data in the particular hierarchy level. This action results in setting the register 91 thereby terminating the signal to AND logic box 90, and also sending a signal 91A to the lower level. This signall 91A is sent forward and serves as one of the inputs for AND logic box 94 at the first hierarchy level. When all of the memory hierarchy levels input their respective signals indicating that the path through the particular hierarchy levels has been completed, the conditions are met that a clear path through the system has been established and is now ready to respond to a request from the processing unit. Notice that replacement page finder request box 17, formerly present in the clear-as-needed system, is eliminated in the clear-path-hierarchy system of FIG. 6B. The execution of the page replacement algorithm box 19 is initiated as previously explained.

However, if the signal from decision box 24 indicates the presence of the marker in the newly identified replacement page frame, a page restore operation will be required. This restore operation will be delayed, however, until the required forward data transmission movement is completed. This delay is insured by the added input to the restore ordering control AND circuit box 38 from inverter box 95, shown in heavy lines. Thus, the restore ordering control action of box 38 will not proceed while there is a memory hierarchy access requirement from the processing unit. When the entire forward primary data transfer is completed, a signal from box 38 initiates a restore requirement action in box 40, and also initiates address switch 43, as in the previous clear-as-needed embodiment, which substitutes the new required address on line 10A. In addition, the signal from box 38 initiates an address search request by box 96 which is passed on to the upper hierarchy levels through OR logic box 97 via line 97A. The response to the restore request follows genenrally the same procedure set forth in the clear-as-needed process. Note that the primary forward transfer function of box 30 is now actuated by a simpler AND logic box 98 than in the corresponding actuation means in the clear-as-needed process.

With the automatic replacement page finder autostart, a certain amount of replacement page finding operations will be carried out concurrently with any further forward page transfer from the lower hierarchy levels. This concurrent replacement page finding will be brought to its completion when the newly identified replacement page is found unmarked, whereas its progress must await the completion of the primary page movement if a page restore operation is necessary to clear a page marker. The one added input to the restore ordering control 38 insures that no restore request can be made before the processing units primary request has been served by the memory storage hierarchy.

Aside from the aforedescribed automatically initiated replacement page finder function, and the postponement of the restore request, other details in the actual reestablishing of the new lower path to take the place of the "consumed" one in the clear-path-hierarchy system is very much the same as the establishing of a fresh path in the clear-as-needed memory hierarchy when the need arises. Two significant new conditions exist in the clear-path-hierarchy, however. The first is the absence of the pending or withheld forward page movement at the time when the path clearly is being done. Second, is the guaranteed availability of the upper cleared path. THese two new conditions together completely eliminate the need of queuing from all hierarchy levels. Further, the entire set of the primary forward page transfer authorization apparataus preceding function box 30 in the transfer control shown in FIG. 5B, may now be replaced by simpler control logics and a single clear path detector, which is also to signal the processing unit through AND logic box 94 and the memory hierarchy busy/ready line 94A. Naturally, instances where congruent classes are defined, there should be established a path through each congruent class.

At this point, attention should be called to the minor burden that the clear-path-hierarchy system has to bear. Unlike a clear-as-needed system, the predefinition of a path in the clear-path-hierarchy, based purely on the chosen page replacement algorithms, lacks the assurance that any scheduled to go page on the predetermined path might not occasionally be a desired item by the user processing unit. Such an occurrence is called an "on-path hit". When an on-path hit does occur, for example, at the level $H_j$, the hit page should have its replacement page pointer bit reset to zero upon being upgraded in the page priority stack or list for that level. This amounts to an equivalent consumption of a lower path section of the length $j$ instead of the length j-1 as an ordinary hit to the $H_j$ level will result. Thus, in this case, it can be said that the effort previously made in clearing the particularly affected path step at level $H_j$ is wasted. However, as all the on-path pages are presumably matured pages, the probability of scoring an unforeseeable on-path hit can only be very small. This small probability would cause a slight degradation in the generally definitely improved average cycle time with the higher class hierarchy.

Although the invention has been particularly shown and described with reference to the preferred embodiments thereof, it will be understood by those skilled in the art that the foregoing and other changes in form and details may be made therein without departing from the spirit and scope of the invention.

What is claimed is:

1. In a hierarchial memory system for use with an electronic computer system wherein said memory system includes a large capacity relatively low speed backing memory store, a plurality of buffer memories located at different levels having increasingly smaller capacities and increasingly higher accessing speeds, the buffer memory at the lowest level responsive to a central processing unit, a plurality of buffer memory control means associated wih said buffer memories that coact and control the respective associated buffer memory that include first transferring means to transfer complete, but of variously defined sizes, pages of data from the backing memory store forward between the said buffer memories, mapping store means associated with each buffer memory to store and, upon inquiry, to indicate the identity and physical location of altered and unaltered page segments of data within said buffer memories, marker means in the said mapping store means to indicate altered page segments, the improvement comprising means to interrogate said mapping store means in response to a command from the central processing unit and/or one of the individual buffer memories, means to indicate buffer memories at upper levels when the requested data is not found in a buffer memory at a certain level, means to determine that a certain positive responding buffer memory at a specific level to the address search command is the buffer memory at the lowest positive responding level, means to form a path of expendable pages which are stored in the individual buffer memories between at least the buffer memory at the lowest level containing a data segment called for by the processing unit and the buffer memory at the level responding directly to the processing unit, and means to initiate said first transfer means to move a data page containing a requested data segment through said path.

2. The hierarchial memory system of claim 1 wherein said means to form a path includes a replacement page finder request issuing means for the buffer memories at each level, a replacement page finder to determine the most expendable data frame available in the buffer memory at a specific level in accordance with a predetermined algorithm in response to a command from any one of the buffer memories located at uppper memory levels.

3. The hierarchial memory system of claim 2 wherein said means to form a path further include a. an accessing means to examine said mapping store means in response to said replacement page finder to determine whether the expendable page frame contains updated data, b. means to indicate to buffer memories located at upper and lower buffer memory levels when the selected page frame in the path is clear of a marker means, and c. means to initiate a page restore operation in the event the step in the path does contain an updated page as indicated by said marker means.

4. The hierarchial memory system of claim 3 wherein said means to form a path includes a restore control means responsive to said accessing means of said mapping store means to transmit to buffer memories located at upper buffer memory levels a request for parent pages for the page indicated to be replaced by the replacement page finder means located at the responding buffer memory level when none of the buffer memories at upper levels has found a page marker pending clearing.

5. The hierarchial memory system of claim 4 wherein said means to form a path includes in said restore control means a naming address issuing and switching means to convey to buffer memories located at upper levels the naming address of an altered page of data residing in a page frame indicated by the replacement page finder means to be vacated.

6. The hierarchial memory system of claim 3 wherein said means to initiate a page restore operation is associated with a secondary forward transfer control means responsive in part to said means to interrogate in response to a request from a buffer level when altered data is indicated in the replacement page frame, to transmit data segments included in the indicated parent page to a buffer memory at a lower buffer memory level.

7. The hierarchial memory system of claim 1 wherein said means to move a data page includes a rearward transfer control means to store back a data page when the parent page is found to exist in a buffer memory at the immediate upper level.

8. The hierarchial memory system of claim 1 wherein said means to form a path includes means to withhold forward transfer of primary data along the path of expendable pages until the path has been completely cleared to the buffer memory at the lowest level.

9. The hierarchial memory system of claim 8 wherein said means to form a path further includes means to utilize at least part of said path of expendable pages for forward and rearward transfer of data pages between buffer memories during the process of forming said path.

10. The hierarchial memory system of claim 1 which further includes a means to automatically reestablish a path of expendable page frames between buffer memories throughout all levels following a primary forward transfer of data.

11. The hierarchial memory system of claim 10 wherein said means to automatically reestablish a path of expendable page frames includes in each buffer memory level a means to select an expendable page frame, a means at each of the next lower buffer memory levels that initiates said means to select an expendable page frame upon completion of a forward page transfer.

12. The hierarchial memory system of claim 10 which further includes in said means to automatically reestablish a path of expendable page frames, means to determine whether or not a page frame in the associated buffer memory at a specific level containing information called for by the processing unit is indicated as an expendable page frame, and a means to remove the page frame from the path of expendable frames when originally so indicated.

13. The hierarchial memory system of claim 10 which further includes in said means to automatically reestablish a path of expendable page frames a signal line through all levels of the system, a means to curtail all data page restore operations between buffer memories until the primary forward data transfer operation required to fulfill a processor requirement is completed.

14. THe hierarchial memory system of claim 10 wherein said means to automatically re-establish a path of expendable page frames includes a means to initiate a data page restore operation to update information in the parent page from altered expendable data pages, and a means to independently request a search of buffer memories located at upper memory levels to locate the parent data page.

15. The hierarchial memory system of claim 10 which includes a means to determine when said means to automatically reestablish a path of expendable pages has completed the path.

16. The hierarchial memory system of claim 15 wherein said means to determine includes a means at each buffer memory level that indicates when the selection of an expendable data frame is complete, a separate signal line from the buffer memory control at each level responsive to said means that indicates when the selection of an expendable frame is complete at that level, an AND circuit having said signal lines as inputs.

* * * * *